United States Patent
Moreno et al.

(10) Patent No.: US 6,822,441 B1
(45) Date of Patent: Nov. 23, 2004

(54) HALF TURN VEHICLE SENSOR HAVING SEGMENTED MAGNET

(75) Inventors: Daniel J. Moreno, El Paso, TX (US); Arquimedes Godoy, Chihuahua (MX); Daniel A. Martinez, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/834,770

(22) Filed: Apr. 28, 2004

(51) Int. Cl.$^7$ ................................................. G01B 7/30
(52) U.S. Cl. .................................. 324/207.25; 335/306
(58) Field of Search ....................... 324/207.11–207.26; 335/296–306

(56) References Cited

U.S. PATENT DOCUMENTS

| | | | |
|---|---|---|---|
| 3,929,519 A | * 12/1975 | Benz | ........................... 335/306 |
| 6,310,473 B1 | * 10/2001 | Zhao | ...................... 324/207.25 |
| 6,593,734 B1 | * 7/2003 | Gandel et al. | ......... 324/207.25 |
| 6,611,790 B1 | * 8/2003 | Reichl et al. | ................ 702/163 |
| 6,769,168 B2 | * 8/2004 | Du | ............................... 29/597 |

* cited by examiner

*Primary Examiner*—Ramon M. Barrera
(74) *Attorney, Agent, or Firm*—Jimmy L. Funke

(57) ABSTRACT

An arc magnet assembly with a virtual radial magnetization is established by placing a series of small trapezoidal-shaped magnet segments having axial magnetizations side by side to form an arc. The arc magnet assembly may be affixed to a rotating component in, e.g., a vehicle to yield a substantially linear magnetic sensor output that represents the speed and/or direction of rotation and/or position of the rotating component.

19 Claims, 1 Drawing Sheet

HALF TURN VEHICLE SENSOR HAVING SEGMENTED MAGNET

I. Field of the Invention

The present invention relates generally to vehicle sensors.

II. Background of the Invention

Modern motor vehicles are equipped with numerous sensors that provide detailed information regarding the operation of the vehicle. This information may be displayed for a driver or it may be processed and provided to various vehicle control systems, for example, to determine the angular speed or angular position of a rotating part in the vehicle, e.g., a crankshaft or drive shaft. Sensed signals may thus represent the angular position or angular speed of the rotating part. These signals can be used in various control systems, e.g., an ignition system and a speed control system.

Many current vehicle sensors require an arc-shaped magnet that has radial magnetization. The arc-shaped magnet is mounted on a rotating component for generating a changing magnetic field when the component rotates, with the field being sensed by a sensor for outputting a signal representative of the speed and/or direction of rotation and/or position of the rotating component. These arc-shaped magnets are expensive to make because they require a large and expensive magnetizer. Nonetheless, radial flux, while expensive to establish in an arc-shaped magnet, remains desirable because it promotes a linear sensor output.

SUMMARY OF THE INVENTION

An arc magnet assembly that has a virtual radial magnetization includes plural discrete magnet segments which have axial magnetizations. The magnet segments are disposed side by side to form an arc. With this structure, a magnetic sensor positioned adjacent the magnet assembly generates a substantially linear magnetic sensor output when the magnet assembly rotates.

In a preferred embodiment, each segment is generally trapezoidal-shaped, and each segment can have a concave inner face and a convex outer face. Magnetic concentrators can straddle the sensor.

In another aspect, a device for sensing at least one parameter (such as speed, direction of rotation, or position) of a rotating component includes a magnetic field sensor and a magnet assembly generally forming an arc and being engageable with the rotating component for movement therewith. As set forth further below, the magnet assembly is established by plural discrete magnets and is juxtaposed with the sensor such that when the magnet assembly is engaged with the rotating component and moves therewith, the sensor generates a substantially linear output signal.

In still another aspect, a method for making an arc magnet having a generally radial magnetization includes providing plural magnet segments, with each having an inner face, an outer face, and an axial magnetization relative to an axis extending between the faces. The method also includes arranging the segments side-by-side with the inner faces forming a substantially continuous arc and with the outer faces forming a substantially continuous arc to thereby form an arc magnet assembly. The magnetic fields of the segments combine to establish a generally radial magnetization of the arc magnet assembly.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
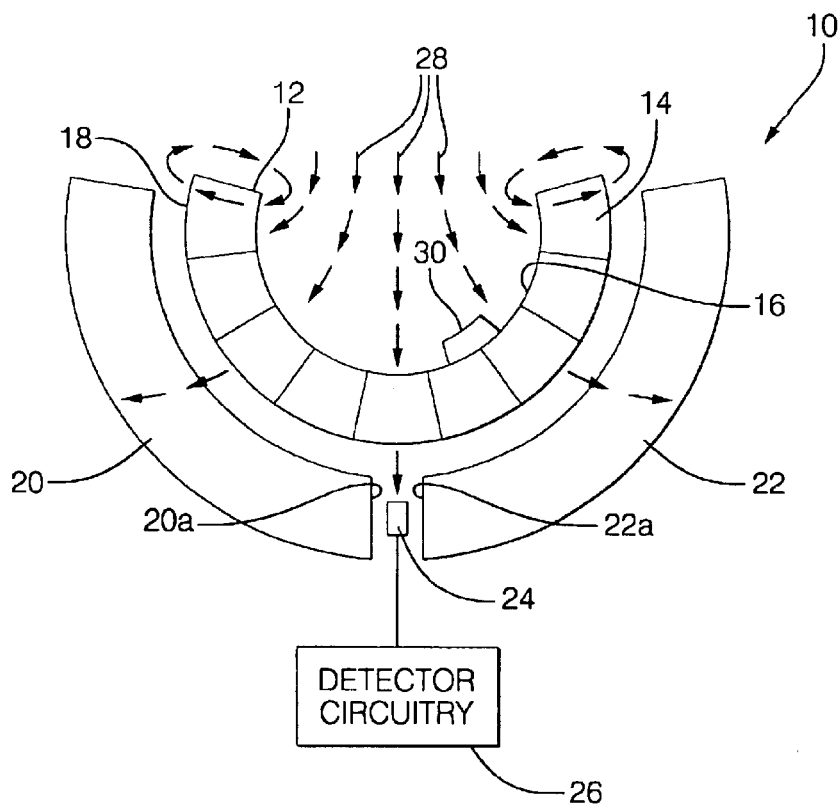
FIG. 1 is a schematic top view of the sensor device having a segmented arc-shaped magnet with a substantially radial magnetization.

Referring initially to FIG. 1, a sensor device is shown, generally designated 10, that includes an arcuate segmented magnet assembly 12. As can be appreciated in reference to FIG. 1, rather than one large unitary arc-shaped magnet being radially magnetized, plural generally trapezoidal-shaped discrete segments 14 are axially magnetized and disposed in the arrangement shown to establish the magnet assembly 12. The generally trapezoidal-shaped segments 14, discussed more fully below, may be composed of any appropriate magnetic material.

As shown in FIG. 1, in the preferred embodiment each generally trapezoidal-shaped segment 14 may have a concave inner face 16 and a convex outer face 18. The segments 14 are configured substantially identically with each other. Each segment 14 touches an adjacent segment 14, with the inner faces 16 forming a continuous arc and the outer faces 18 forming a continuous arc. When the segments 14 are arranged side-by-side in an arc as shown, and in such a way where all segments are adjacent and touching, the arcuate (e.g., horseshoe-shaped) magnet assembly 12 is formed, as seen in FIG. 1.

FIG. 1 further shows that the magnet assembly 12 preferably is juxtaposed with a pair of magnetic concentrators 20, 22 in accordance with principles known in the art. Each concentrator 20, 22 extends generally along one-half the outer contour of the magnet assembly 12, with opposed ends 20a, 22a of the concentrators 20, 22 being closely spaced from each other at what might be thought of as the apogee of the arc formed by the magnet assembly 12. A magnetic field sensor 24 is located between the ends 20a, 22a of the pair of concentrators 20, 22. The sensor 24 may be a Hall effect sensor, MR sensor, or other magnetic field sensor. In any case, the sensor 24 is electrically connected to detector circuitry 26 in accordance with principles known in the art to process a linear signal from the sensor 24 that is based on the magnetic field generated by the magnet assembly 12.

It may be appreciated in reference to magnetic flux arrows 28 in FIG. 1 that the field of the magnet assembly 12 approaches radial magnetization as a result of the cooperation between the individual fields of the axially magnetized segments 14. The radial magnetization flux arrows 28 indicate that the combined field of the magnet assembly 12 propagates toward the inner edge of the magnet assembly 12 substantially perpendicularly to the local tangent of the inner edge at the point of flux entry. The flux moves across the magnet to exit the outer edge, again substantially perpendicularly to the local tangent to the outer edge at the point of flux exit, toward the magnetic concentrators 20, 22. With the virtual radial magnetization of the magnet assembly 12, the output of the sensor 24 changes substantially linearly when the magnet assembly 12 is rotated with respect to the concentrators 20, 22. Thus, the arcuate magnet assembly 12 may be affixed to a rotating component 30 in a vehicle to yield a linear sensor 24 output that represents at least one of the speed, direction of rotation, and position of the rotating component. It is preferred that a relatively large number of relatively small segments 14 are used, so that the resulting combined field more closely approaches a true radial field.

Figure 2:
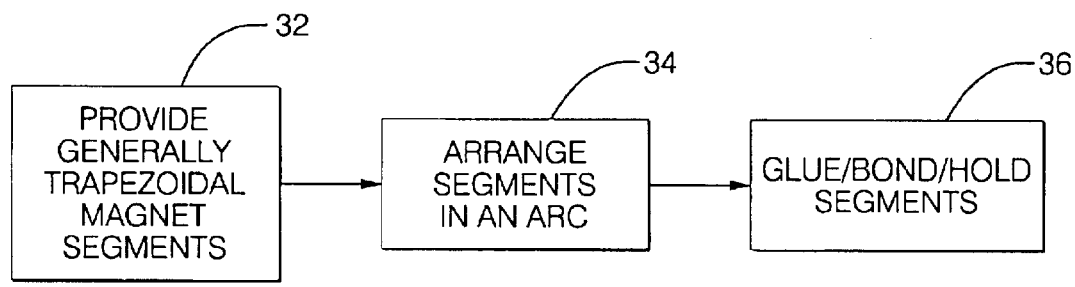
FIG. 2 is a flow chart of the method for making the magnet shown in FIG. 1.

Now referring to FIG. 2, at block 32 the segments 14 are provided in an axially magnetized state, i.e., with magnetic field lines entering the inner face 16 normal thereto and exiting the outer face 18 normal thereto. At block 34 the segments 14 are positioned side-by-side as shown in FIG. 1 to establish the magnet assembly 12, with the axial fields of the individual segments 14 combining to establish a generally radial magnetization for the magnet assembly 12. It is preferred that a relatively large number of relatively small segments 14 are used, so that the resulting combined field more closely approaches a true radial field. Block 36 indicates that the segments 14 are held together by gluing, bonding, or by other suitable means, e.g., by welding or soldering the segments 14 onto an underlying substrate.

Similar results can be obtained by a magnetic configuration where segment magnetic polarization is in the direction opposite that shown in FIG. 1. In this case, magnetic field lines enter the outer face normal thereto and exit the inner face normal thereto. The magnetic flux lines propagate toward the outer edge of the magnetic assembly substantially perpendicular to the local tangent of the edge at the point of flux entry. The flux moves across the magnet to exit the inner edge, again substantially perpendicular to the local tangent to the inner edge at the point of flux exit.

While the particular HALF TURN VEHICLE SENSOR HAVING SEGMENTED MAGNET as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. An arc magnet assembly having a virtual radial magnetization, comprising:

plural discrete magnet segments having axial magnetizations and being disposed side by side to form an arc, whereby a magnetic sensor positioned adjacent the magnet assembly generates a substantially linear magnetic sensor output when the magnet assembly rotates.

2. The assembly of claim 1, comprising the sensor.

3. The assembly of claim 1, wherein each segment is generally trapezoidal-shaped.

4. The assembly of claim 1, wherein each segment is formed with a concave inner face.

5. The assembly of claim 1, wherein each segment is formed with a convex outer face.

6. The assembly of claim 1, wherein each segment is generally trapezoidal-shaped and is formed with a concave inner face and a convex outer face.

7. The assembly of claim 2, further comprising at least two magnetic concentrators straddling the sensor.

8. A device for sensing at least one parameter of a rotating component, comprising:

a magnetic field sensor; and a magnet assembly generally forming an arc and being engageable with the rotating component for movement therewith, the magnet assembly being established by plural discrete magnets and being juxtaposed with the sensor such that when the magnet assembly is engaged with the rotating component and moves therewith, the sensor generates a substantially linear output signal.

9. The device of claim 8, wherein each discrete magnet is axially magnetized such that the magnet assembly has a virtual radial magnetization when the discrete magnets are arranged side-by-side in an arc to establish the magnet assembly.

10. The device of claim 8, wherein each discrete magnet is generally trapezoidal-shaped.

11. The device of claim 8, wherein each discrete magnet is formed with a concave inner face.

12. The device of claim 8, wherein each discrete magnet is formed with a convex outer face.

13. The device of claim 8, wherein each discrete magnet is generally trapezoidal-shaped and is formed with a concave inner face and a convex outer face.

14. The device of claim 8, further comprising at least two magnetic concentrators straddling the sensor.

15. A method for making an arc magnet having a generally radial magnetization, comprising:

providing plural magnet segments each having an inner face, an outer face, and an axial magnetization relative to an axis extending between the faces; and arranging the segments side-by-side with the inner faces forming a substantially continuous arc and the outer faces forming a substantially continuous arc to thereby form an arc magnet assembly, whereby the magnetic fields of the segments combine to establish a generally radial magnetization of the arc magnet assembly.

16. The method of claim 15, further comprising juxtaposing plural magnetic concentrators with the magnet assembly.

17. The method of claim 16, further comprising juxtaposing a magnetic sensor with the magnet assembly between the concentrators.

18. The method of claim 17, further comprising engaging the magnet assembly with a rotating component.

19. The method of claim 18, wherein the component is in a vehicle.

* * * * *